(12) United States Patent
Ignatowicz

(10) Patent No.: US 7,622,715 B2
(45) Date of Patent: Nov. 24, 2009

(54) METHOD AND APPARATUS FOR CAPTURING AND ANALYZING THERMO-GRAPHIC IMAGES OF A MOVING OBJECT

(75) Inventor: Steven Ignatowicz, Grayslake, IL (US)

(73) Assignee: Fluke Corporation, Everett, WA (US)

( * ) Notice: Subject to any disclaimer, the term of this patent is extended or adjusted under 35 U.S.C. 154(b) by 385 days.

(21) Appl. No.: 11/243,258

(22) Filed: Oct. 4, 2005

(65) Prior Publication Data

US 2006/0228100 A1 Oct. 12, 2006

Related U.S. Application Data

(60) Provisional application No. 60/670,175, filed on Apr. 11, 2005.

(51) Int. Cl.
*G02F 1/01* (2006.01)
(52) U.S. Cl. .................................... 250/330
(58) Field of Classification Search ................ 250/330, 250/334
See application file for complete search history.

(56) References Cited

U.S. PATENT DOCUMENTS

| | | | | |
|---|---|---|---|---|
| 4,040,087 A | * | 8/1977 | Hall | 348/165 |
| 4,560,869 A | * | 12/1985 | Hien et al. | 250/235 |
| 5,159,198 A | * | 10/1992 | Kohsaka et al. | 250/330 |
| 5,329,381 A | * | 7/1994 | Payne | 358/3.29 |
| 6,894,636 B2 | * | 5/2005 | Anderton et al. | 342/22 |
| 7,139,411 B2 | * | 11/2006 | Fujimura et al. | 382/103 |
| 2001/0021224 A1 | | 9/2001 | Larkin et al. | |
| 2003/0197124 A1 | | 10/2003 | Wood | |

FOREIGN PATENT DOCUMENTS

| | | |
|---|---|---|
| GB | 2 280 812 | 2/1995 |
| WO | WO-2004/079659 | 9/2004 |

OTHER PUBLICATIONS

Gonzalez et al., "Digital Image Processing, Passage," Prentice Hall, pp. 256-270 (2002).

* cited by examiner

*Primary Examiner*—David P Porta
*Assistant Examiner*—Kiho Kim
(74) *Attorney, Agent, or Firm*—Fredrikson & Byron, P.A.

(57) ABSTRACT

One aspect of the disclosure provides a method of correcting a distorted image including, capturing an image of a moving object, thereby obtaining a plurality of pixels that comprise the image; obtaining a speed of the moving object; obtaining a correction factor dependant on the speed of the object; and applying the correction factor to the plurality of pixels, thereby obtaining a corrected image.

17 Claims, 7 Drawing Sheets

Flow chart for obtaining the correction factor CF

Figure 5A
Figure 5B
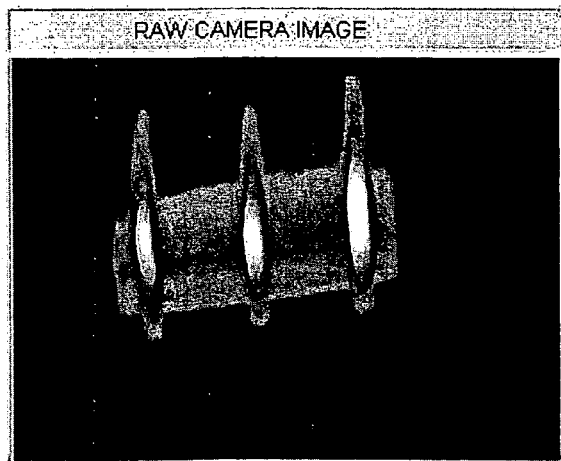
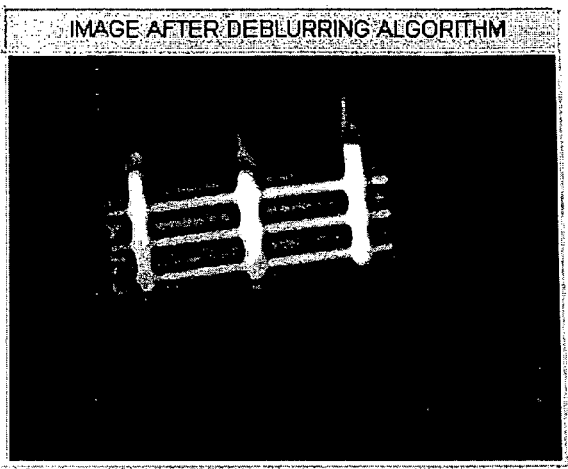
Figure 5C
Figure 5D
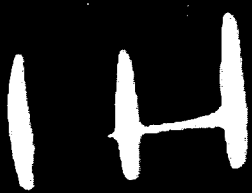
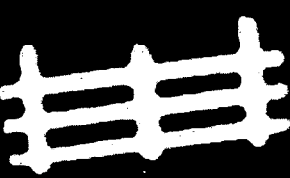

US 7,622,715 B2

METHOD AND APPARATUS FOR CAPTURING AND ANALYZING THERMO-GRAPHIC IMAGES OF A MOVING OBJECT

RELATED APPLICATION DATA

The present application is a non-provisional application based on, and claiming the priority benefit of, co-pending U.S. provisional application Ser. No. 60/670,175, which was filed on Apr. 11, 2005, and is expressly incorporated herein by reference.

BACKGROUND

1. Field of the Disclosure

The disclosure generally relates to a method and apparatus for capturing and analyzing thermo-graphic images of moving objects. More particularly, the disclosure relates to a method and apparatus for correcting the distortion in thermo-graphic images caused when capturing an image of a moving object.

2. Brief Description of Related Technology

Infrared imaging cameras are well suited and have previously been used for monitoring thermal profiles of stationary targets. For example, portable imagers are commonly used in maintenance applications to detect hot spots in machinery. Similarly, portable images may be used to detect whether a boiler or molten metal container is in an acceptable temperature range. On-line cameras are available for process control applications, such as measuring the temperature of molded parts being ejected from a molding machinery. These types of imagers and cameras are limited in their usage, however, due to response time limitations. For example, the imagers and cameras may be limited to use with stationary or slow moving processes.

In a typical on-line application, a thermal snapshot is first taken of the object to be inspected. The resulting image is then analyzed using one or more techniques found in common vision systems. For example, the image may be analyzed by comparing it to a reference image and/or by looking for missing segments. Such thermal image may be used for checking upper and/or lower limits of acceptable temperatures.

The slow response time of current cameras and imagers, however, causes blurring in the image when the part is moving too quickly. For example, a large majority of process control applications are best suited for cameras operating in the 8-12 micron waveband, which utilizes a microbolometer detector with a typical response time of 100 milliseconds. Even with the faster 16 millisecond response time in an amorphous silicon detector there is still substantial blurring for most moving target applications.

As a result, the faster the part moves, the greater the blurring of the image. A blurred image does not yield sufficiently good results which are needed for many of the analyzing functions. In addition, a blurred image does not yield accurate temperature readings.

SUMMARY

One aspect of the disclosure provides a method of correcting a distorted image including, capturing an image of a moving object, thereby obtaining a plurality of pixels that comprise the image; obtaining a speed of the moving object; obtaining a correction factor dependant on the speed of the object; and applying the correction factor to the plurality of pixels, thereby obtaining a corrected image.

Further aspects and advantages may become apparent to those skilled in the art from a review of the following detailed description. While the invention is susceptible of embodiments in various forms, described hereinafter are specific embodiments with the understanding that the disclosure is illustrative, and is not intended to limit the invention to the specific embodiments described herein.

BRIEF DESCRIPTION OF THE DRAWINGS

FIG. 5A is a raw thermal image of the object of FIG. 4, with the object in motion;

FIG. 5B the raw thermal image of FIG. 5A after being corrected for blurring caused by the movement of the object;

FIG. 5C is an image of blob results of the raw thermal image of FIG. 5A; and

FIG. 5D the corrected image of blob results of FIG. 5C after being corrected for blurring caused by the movement of the object.

DETAILED DESCRIPTION

Although the following text sets forth a detailed description of numerous different embodiments of the invention, it should be understood that the legal scope of the invention is defined by the words of the claims set forth at the end of a patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent application, which would still fall within the scope of the claims defining the invention.

Figure 1:
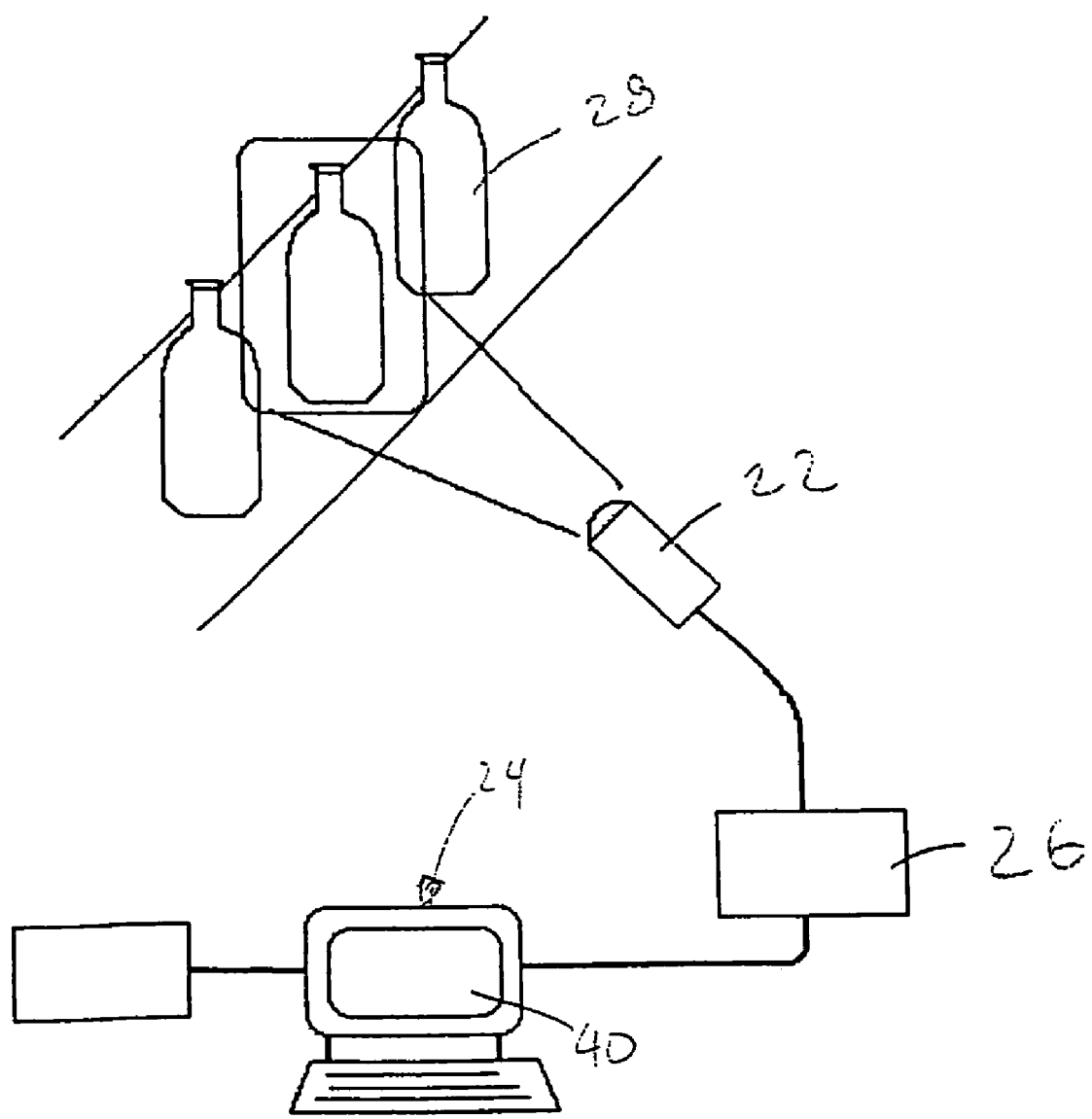
FIG. 1 is a diagram of a thermal imaging system used to capture thermal images of moving objects.

Referring to FIG. 1, an infrared detection system 20 as disclosed herein includes an imager 22 communicatively connected to a controller 24. In this exemplary embodiment, the imager 22 is a thermal imaging camera and the controller 24 is a personal computer (PC) having a monitor 40. A frame grabber 26 for capturing numerous thermal images may be communicably disposed between the controller 24 and the imager 22. The frame grabber 26 may be used to digitize and/or store video information into a bitmap image, for example. Frame grabbers can be stand-alone units or may be a function built into a video graphics boards. As will be described in more detail below, the infrared detection system 20 may capture thermal images of moving objects 28 such as ones transported on a conveyor belt, for example. The thermal image, due to the movement of the object 28, may be blurred or otherwise distorted thereby providing an unusable or highly inaccurate thermal image of the object 28. It is this blurring and/or distortion of the thermal image that infrared detection system 20 as disclosed herein corrects and/or accommodates.

The thermal imagine camera 22, as illustrated in FIG. 1, has a certain resolution that depends on the specific imager that is used. In this exemplary embodiment, an imager having 76800 pixels organized as a 320×240 array was used, even though other sizes and geometries are available. For simplicity and brevity, the below method will be described in terms of one single pixel, but as those skilled in the art are aware, the actual implementation of the method may be applied to every pixel in the detector array.

Figure 2:
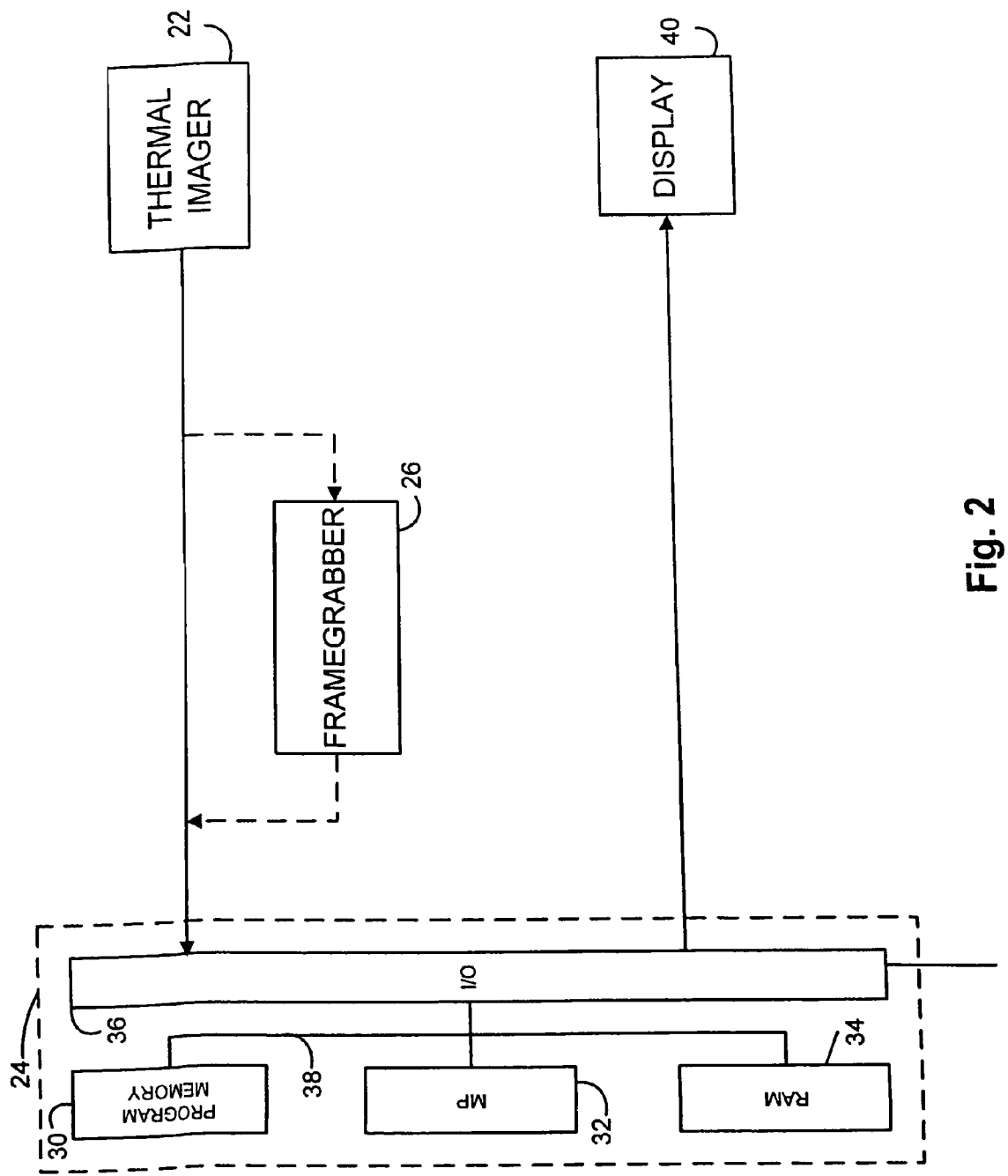
FIG. 2 is a block diagram of electronic component of a controller unit used in the thermal imaging system of FIG. 1.

The controller 24, as seen FIG. 2, may be communicable coupled to the thermal image camera 22, via the frame grabber 26, and may include a program memory 30, a microcontroller or microprocessor (MP) 32, a random-access memory (RAM) 34, and an input/output (I/O) circuit 36, all of which may be interconnected via an address/data bus 38. It should be appreciated that although only one microprocessor 32 is shown, the controller 24 may include additional microprocessors. Similarly, the memory of the controller 24 may include multiple RAMs 34 and multiple program memories 30. Although the I/O circuit 36 is shown as a single block, it should be appreciated that the I/O circuit 36 may include a number of different types of I/O circuits. The RAM(s) 34 and program memories 30 may be implemented, for example, as semiconductor memories, magnetically readable memories, and/or optically readable memories or other memories recognized by those of ordinary skill in the art.

FIG. 2 illustrates that the camera 22, including the frame grabber 26, and the monitor or display 40 may be operatively coupled to the I/O circuit 36. Each of the above components may be so coupled by a unidirectional or bidirectional, single-line or multiple-line data link, which may depend on the design of the components that are used.

Components may be connected to the I/O circuit 36 via a direct line or conductor. Different connection schemes could be used. For example, one or more of the components shown in FIG. 2 may be connected to the I/O circuit 36 via a common bus or other data link that is shared by a number of components. Furthermore, those of ordinary skill in the art will recognize that some of the components may be directly connected to the microprocessor 32 without passing through the I/O circuit 36.

Figure 3:
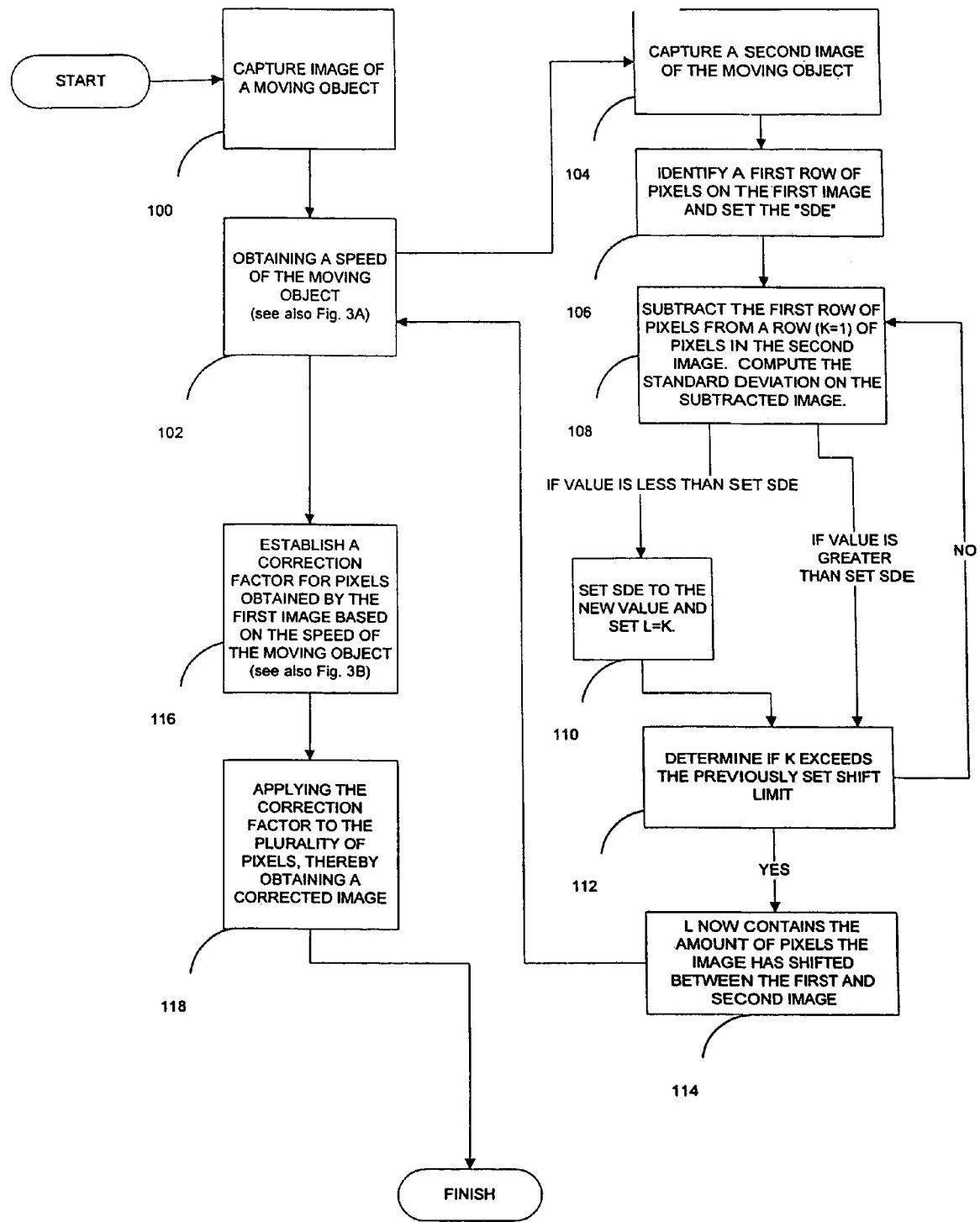
FIG. 3 is a flowchart of one exemplary operation of obtaining a corrected thermal image captured by the system of FIG. 1.

The images, once received by the controller 24 from the imager 22 and/or the frame grabber 26, will be corrected to obtain a clearer and more accurate thermal image. More specifically, the controller 24 may be programmed to correct the pixels of the thermal image, such that a true value of the pixel can be obtained or at least closely estimated. One such exemplary operation, as illustrated in FIG. 3, includes determining the speed of the object as it is moving through the field of view of the camera (102) (see also FIG. 3A), obtaining a correction factor for the pixels in the image (116) (see also FIG. 3B), and applying the correction factor to the plurality of pixels (118). As those skilled in the art will recognize, the following operation may be accomplished in various ways one of which will be described herein. As a result, the below specified operation may include additional or alternate steps, or may be accomplished with some of the steps deleted or combined.

Figure 4:
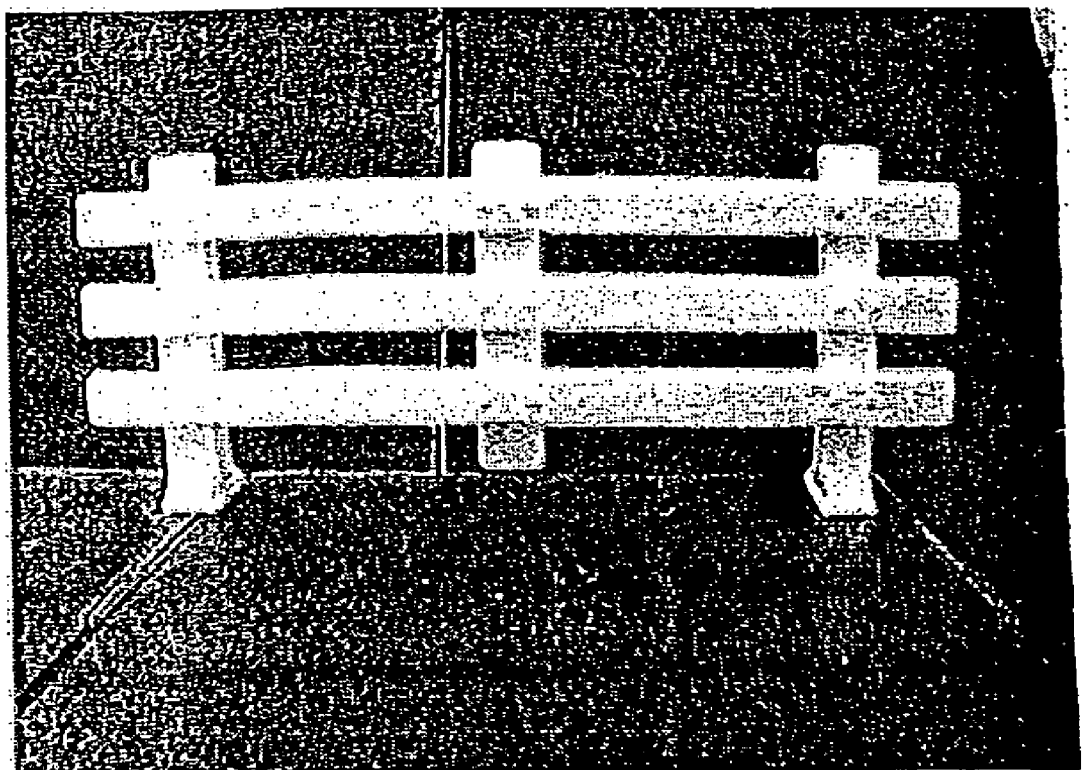
FIG. 4 is a picture of an object used with the thermal imaging system of FIG. 1, as seen standing still without the use of a thermal imager.

As seen in FIGS. 1 and 3, the camera may capture one more images (100, 104) of a moving object 28, which may be obtained with the aid of the frame grabber 26. The object 28, in this exemplary operation as is seen in FIG. 4, is a plastic fence from a toy play set that was heated and then dropped in the field of view of the camera 22. The raw image, as seen in FIG. 5A, shows the object as captured by the camera 22 while in motion, thereby creating the substantially blurred or distorted effect.

In one example, the speed of the object during the capturing process is obtained by comparing two sequential images (first image and second image) to determine the number of pixels the objects moved between the first and second images (102). More specifically, the frame rate or the time it takes to capture an image with the imager 22 is known, which is typically at around 50 or 60 frames per second. The speed at which the object is moving can, therefore, be determined by knowing the number of pixels the objects moved between the first and the second image and the frame rate.

The "speed" of the object as referred to herein, is not the true speed as measured in distance over time, but rather a relative speed that is representative of the number of pixels the object has traveled between the taking of the first and the second image. In order to measure the speed, however, it must first be determined how many pixels the object has traveled. In one example, the number of pixels the object 28 has traveled may be determined by corresponding at least a portion of the object 28 on the first image to the same portion of the object 28 on the second image. In other words, by corresponding at least a portion of the object 28 on the first image to the same portion on the second image, the number of pixels between the portions on the respective images will be the number of pixels the object has moved between the capturing of the first and second images.

Figure 3A:
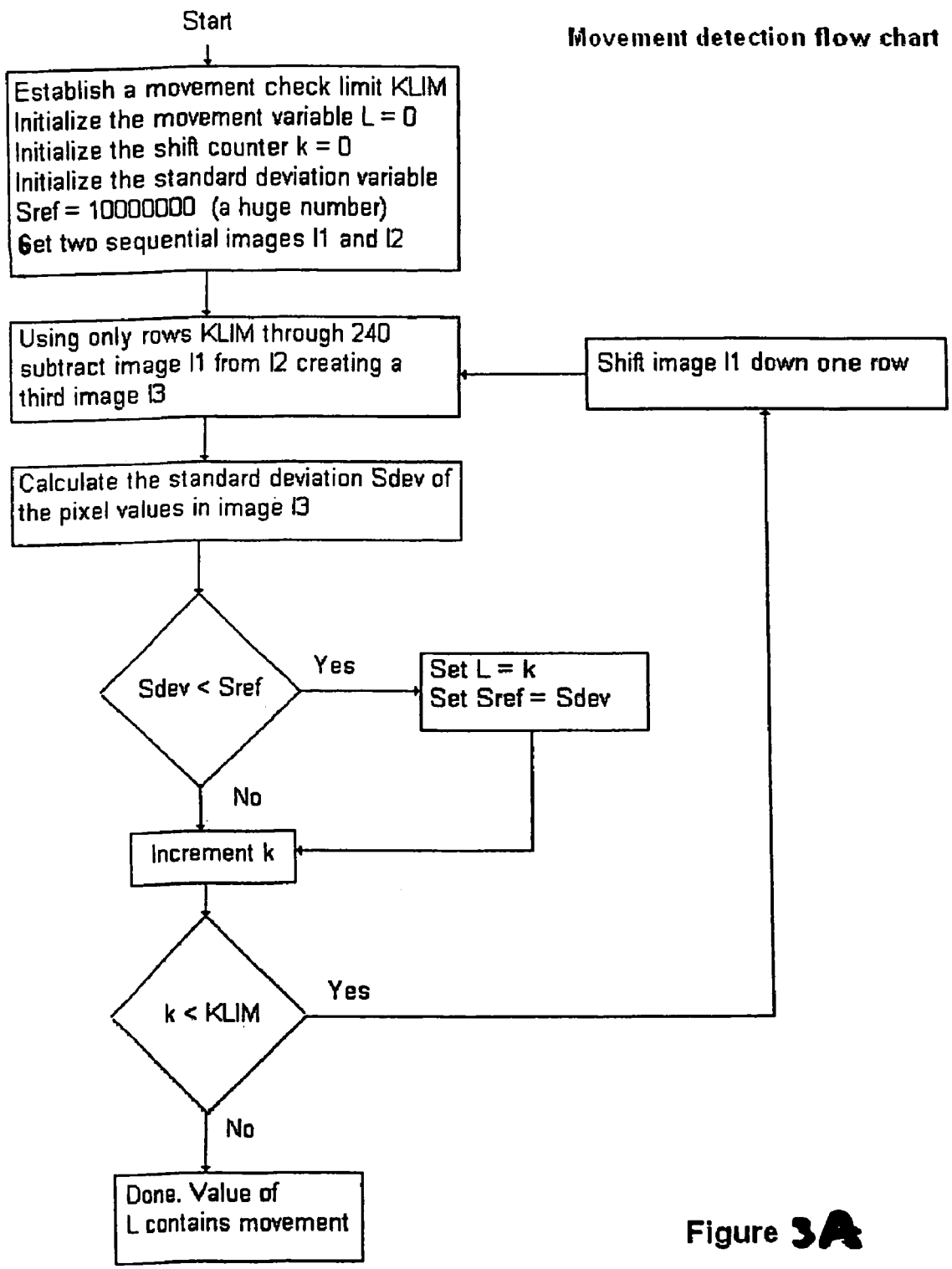
FIG. 3A is a flowchart of one exemplary operation of obtaining a speed of the object of FIG. 1.
Figure 3B:
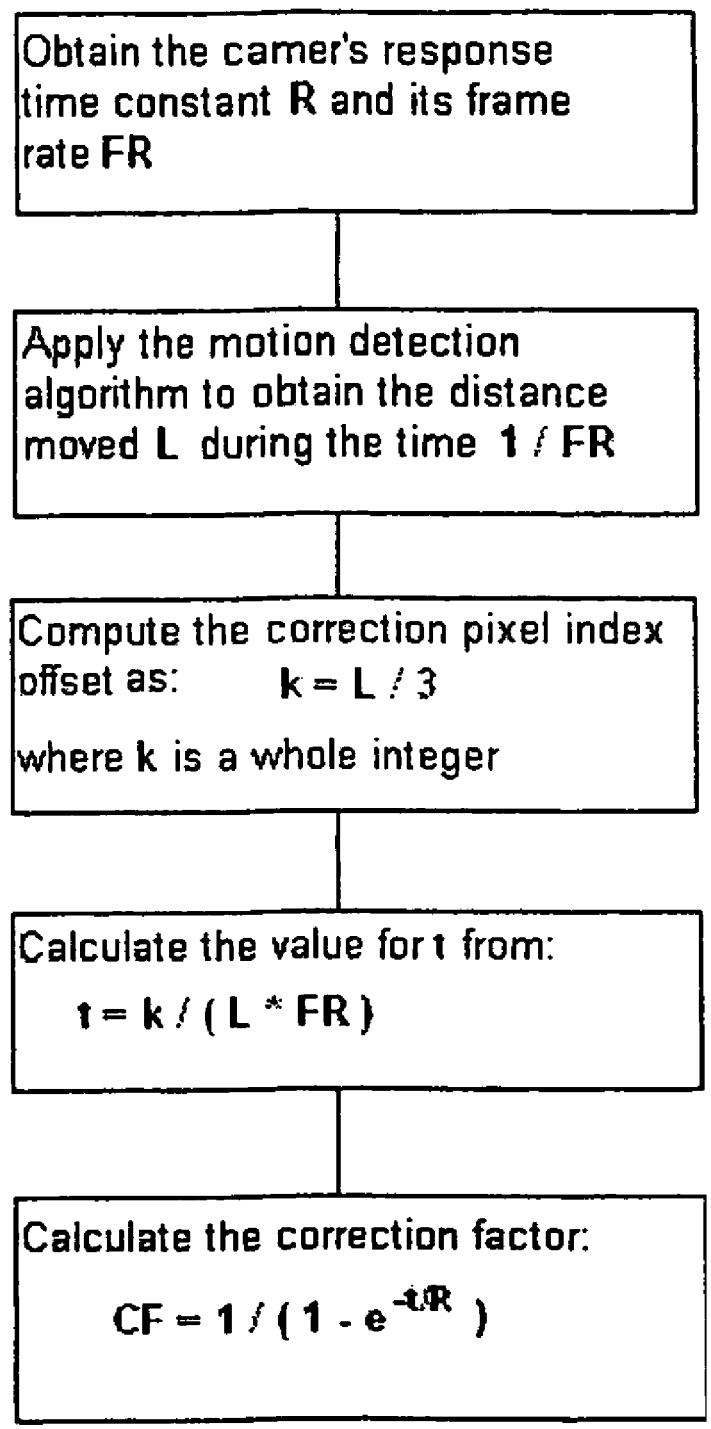
FIG. 3B is a flowchart of one exemplary operation of obtaining a correction factor for the thermal image captures from the moving object of FIG. 1.

As seen in FIGS. 3 and 3A, the object 28 may be located by comparing a particular row of pixels on the first image to the rows of pixels on the second image. Once a match to the first row of pixels is found in the second image, the number of pixels there between can be determined.

More specifically, the object may be located on the second image by setting a shift counter ("K"), which counts the number of pixel rows to 0, and setting the standard deviation of error ("SDE") variable of the pixel intensity to 1,000,000. At this instance, the theoretical number of pixels between the object on the first and second images ("L") is 0. The shift counter may now be shifted to K=1, which is representative of a first line of pixels on the second image which is then subtracted from the original line of pixels on the first image. The standard deviation is then computed on the subtracted image. If the value is less than the set SDE, then the SDE is set to the newly acquired SDE and L is set equal to K.

It may now be determined whether the number of rows K has exceeded a previously determined shift limit. For example, if the shift limit is K=60 then the shift limit will not be attained until 60 rows of pixels have been evaluated. This may be done to ensure that a reasonable but not excessive amount of pixels are evaluated. If the limit has not been reached, the shift counter will go to K=2 or second row of pixels and repeat the above-mentioned step until the shift limit has been reached.

If, however, the shift limit has been obtained, the K value obtained in the previous step is representative of the amount of pixels the image has shifted between the first and second image.

In other words, the speed is determined by shifting a partial image from one frame and subtracting it from the image of the next frame until the smallest standard deviation of error is achieved. The amount of pixel shift is then inversely proportional to the exposure time. This operation assumes that the process is moving in a single direction which substantially reduces the controller calculation time. Otherwise, all combinations of movement would have to be tested to find the smallest standard deviation of error. Programming may reduce the controller overhead to find the minimum standard deviation of error.

For example, one approach is to implement a two step search algorithm. The first pass would step in large pixel movements over the full range and the second pass would step in single pixel movements around the result from the first pass. Further reductions are possible by testing smaller portions of the image and restricting the maximum movement detected. The limit on movement detection may be based on the application.

Once the speed of the object has been determined the image correction factor can be determined to achieve a corrected image as seen in FIG. 5B. One exemplary algorithm, for obtaining a correction factor is as follows:

$$P_t = P_0 + (P_f - P_0)*(1 - e^{-t/R})$$

Where:

$P_t$ is the Pixel value or intensity at time t;

$P_0$ is the initial Pixel value or intensity;

$P_f$ is the expected final Pixel value or intensity for a stationary target;

t is the exposure time; and

R is the detector time constant.

$P_f$ is computed by rearranging the equation:

$$P_f = P_0 + (P_t - P_0)/(1 - e^{-t/R})$$

The equation assumes that the pixel is exposed to a constant target temperature during time t which, in this example, is not true since the target is moving. The preceding pixel in a single image frame will have observed approximately the same target just 1 pixel time earlier but using it will also require the largest correction factor. Detectors are not perfect and they contain noise in their output. The correction factor may amplify noise that would push for determining $P_0$ from a Pixel further away than just one pixel. One aspect of the implementation of the equation is getting a value for $P_0$ and t where the equation makes a good approximation.

The correction factor may also be applied to images other than raw images. For example, as seen in FIGS. 5C and 5D, the correction factor may be applied to blob results as well. More specifically, FIG. 5C depicts a blob image of the raw image of FIG. 5A. The raw image is as it comes out of the camera (FIG. 5A). For a monochrome type of camera a raw image would contain various values from light to dark, or grayscale values. The blob result comes from a common function in vision systems where the pixels of the image are converted to either true or false values, such as the binary choices 1 or 0, depending on whether the grayscale value is above or below some threshold. For presentation purposes the resulting values can then be shown in any two distinct colors such as black and white, and thereby removing any shades of gray in the image. For example, if the value is greater than the threshold then the corresponding blob pixel is made white, otherwise it is set to black. The resulting blob is sometimes easier to work with in locating parts and in doing dimensional analysis on the part.

As mentioned previously, there is a compromise between correction factor and $P_0$ reliability. For example, the cameras used to verify the algorithm yielded the best results when the t/R term equaled 0.4 which would mean an overall correction factor of about 3. With the test cameras having an R value of 14 milliseconds and a frame interval of 16.7 milliseconds it was determined that dividing L by 3 yields the best location to grab $P_0$. If there is no concern for correcting slow moving images then the correction algorithm can be simplified to:

$$k = L/3$$

$$P_1[i][j] = P[i+k][j] + 3*(P[i][j] - P[i+k][j])$$

Where:

$P_1[i][j]$ represents a single element of the image after correction;

$P[i][j]$ represents a single element of the image before correction;

i selects a row;

j selects a column;

k is the row offset computed from the image movement; and

L is the speed or amount of travel.

Note that the number of rows in the image that can be corrected is reduced by the value of k.

Once the image has been corrected, it may be determined if the image contains an object to be analyzed. One example of determining whether the image contains an object is to slide a stored reference image of the object around the corrected camera image, such that it can be determined whether a reasonable match between the stored and the captured image exists. This may be accomplished using a correlation technique.

Another manner of determining whether the image contains an object is to slide the reference over the image and check if a standard deviation of error from the subtracted images meets a criteria similar to the way the speed algorithm works. Other approaches are useable as well.

The above exemplary embodiments may be varied to achieve and/or create additional or alternative features. For example, if a process has a constant known speed it is not necessary for the software to determine the speed of the object. The present disclosure is most applicable to real time camera correction for process inspections, however, the correction technique may be used for single snapshot images in a manual mode as well. As such, even if the speed of the captured object is unknown, through trial and error of adjusting the correction spacing, a good image may be recovered. Additionally, while the method was developed to enhance images from infrared imaging cameras the technique may be applied to any type of camera that may have a slow responding detector. The values as used herein for the set SDE, K and L are also only exemplary and are not intended to limit the scope of the disclosure.

The above described steps may be programmed in the controller, and/or may be saved onto a computer readable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of "computer readable media."

The foregoing description is given for clearness of understanding only, and no unnecessary limitations should be understood therefrom, as modifications within the scope of the invention may be apparent to those having ordinary skill in the art.

What is claimed is:

1. A method of correcting a distorted thermal image, comprising:
    capturing a first raw image of a moving object in a first position with a thermal imaging device, thereby obtaining a plurality of pixels that comprise the first raw image;
    capturing a second raw image of the moving object in a second position with the thermal imaging device, wherein the second position generally varies in only one direction from the first position;
    obtaining a speed of the moving object, wherein obtaining the speed of the moving object includes comparing the first raw image to the second raw image and analyzing the variation of the images with respect to a known frame rate of the thermal imaging device;
    obtaining a response time for the thermal imaging device;
    obtaining a correction factor to compensate for the distortion of the first raw image caused by the movement of the object, wherein the correction factor is dependent on the speed of the moving object and the response time of the thermal imaging device; and
    applying the correction factor to the plurality of pixels, thereby obtaining a corrected image.

2. The method of claim 1 wherein the second position is at a lower elevation than the first position.

3. The method of claim 1, wherein the first raw image and the second raw image are captured while the thermal imaging device remains stationary, thereby obtaining the first raw image and the second raw image within a stationary field of view of the thermal imaging device.

4. The method of claim 1, wherein capturing the second raw image of the moving object thereby obtains a second plurality of pixels that comprise the second raw image.

5. The method of claim 4, wherein obtaining the speed of the moving object includes comparing the plurality of pixels to the second plurality of pixels and analyzing the variations between the plurality of pixels and the second plurality of pixels.

6. The method of claim 5, further comprising selectively converting the gray pixels of each of the plurality of pixels and the second plurality of pixels to one of either black or white pixels, prior to obtaining the speed of the moving object.

7. The method of claim 5, wherein the plurality of pixels and the second plurality of pixels are gray pixels.

8. The method of claim 1, wherein the speed of the moving object is independent of the thermal imaging device.

9. A computer-readable medium having computer-executable instructions for performing steps, comprising:
    (a) obtaining a first raw image of a moving object from a thermal imaging device, the first raw image comprising a plurality of pixels of the moving object in a first position;
    (b) obtaining a second raw image from the thermal imaging device of the moving object in a second position;
    (c) obtaining a speed of the moving object, wherein obtaining the speed of the moving object includes comparing the first raw image to the second raw image and analyzing the variation of the images with respect to a known frame rate of the thermal imaging device; and
    (d) applying a correction factor to the plurality of pixels to obtain a corrected image of the moving object.

10. The medium of claim 9 further including the step of obtaining a response time of the thermal imaging device.

11. The method of claim 10 wherein the correction factor is dependent on the speed of the moving object and the response time of the thermal imaging device.

12. The method of claim 9, wherein the first raw image and the second raw image are obtained while the thermal imaging device remains stationary, thereby obtaining the first raw image and the second raw image within a stationary field of view of the thermal imaging device.

13. The method of claim 9, wherein obtaining the second raw image of the moving object thereby obtains a second plurality of pixels that comprise the second raw image.

14. The method of claim 13, wherein obtaining the speed of the moving object includes comparing the plurality of pixels to the second plurality of pixels and analyzing the variations between the plurality of pixels and the second plurality of pixels.

15. The method of claim 14, wherein the plurality of pixels and the second plurality of pixels are gray pixels.

16. The medium of claim 15 further including the step of selectively converting the gray pixels of each of the plurality of pixels and the second plurality of pixels to one of either black or white pixels, prior to obtaining the speed of the moving object.

17. The method of claim 9, wherein the speed of the moving object is independent of the thermal imaging device.

* * * * *